US009827836B2

(12) United States Patent
Nellen et al.

(10) Patent No.: US 9,827,836 B2
(45) Date of Patent: Nov. 28, 2017

(54) ROLLO ASSEMBLY

(71) Applicant: Inalfa Roof Systems Group B.V., Oostrum (NL)

(72) Inventors: Marcel Johan Christiaan Nellen, Merselo (NL); Eduardus Christianus Van Boxtel, Zeeland (NL); Bart Johannes Maria Van Neer, Linne (NL); Suyanto Teri Wahiyu Ten-Jet-Foei, Nijmegen (NL); Franciscus Antonius Gerardus Vogels, Oirschot (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 15/280,435

(22) Filed: Sep. 29, 2016

(65) Prior Publication Data

US 2017/0158034 A1     Jun. 8, 2017

(30) Foreign Application Priority Data

Dec. 3, 2015     (EP) .................................... 15197772

(51) Int. Cl.
*B60J 3/02*     (2006.01)
*B60J 7/00*     (2006.01)
*B60J 7/185*     (2006.01)

(52) U.S. Cl.
CPC ............. *B60J 7/0015* (2013.01); *B60J 7/185* (2013.01)

(58) Field of Classification Search
CPC .................................................... B60J 7/0015
USPC ............................................ 296/214, 216.08
See application file for complete search history.

(56) References Cited

U.S. PATENT DOCUMENTS

| 4,159,144 A * | 6/1979 | Ehlen ...................... B60J 7/022 |
| | | 296/216.04 |
| 4,298,226 A * | 11/1981 | Mizuma ................... B60J 7/022 |
| | | 296/216.04 |
| 6,428,090 B1 * | 8/2002 | Reinsch ................. B60J 7/0053 |
| | | 296/216.08 |

FOREIGN PATENT DOCUMENTS

| DE | 102012019078 A1 | 3/2013 |
| DE | 102014005476 A1 | 10/2015 |

OTHER PUBLICATIONS

European Search Report and Written Opinion for European patent application No. 15197772.5, dated Jun. 1, 2016.

* cited by examiner

*Primary Examiner* — Dennis H Pedder
(74) *Attorney, Agent, or Firm* — Steven M. Koehler; Westman, Champlin & Koehler, P.A.

(57) ABSTRACT

A rollo assembly intended for use in an open roof construction for a vehicle, comprises a rotatable winding shaft, a rollo screen of which a rear end can be wound on or off said winding shaft and of which an opposite forward end is provided with an operating beam, and opposite guide channels for in a longitudinal direction guiding opposite side edges of the rollo screen and opposite ends of the operating beam. Each of the guide channels is divided into a removable first guide channel part closest to the winding shaft and a second guide channel part further away from the winding shaft, wherein aligning means are provided for, in an assembled position of the rollo assembly, aligning respective ones of the first and second guide channel parts.

17 Claims, 14 Drawing Sheets

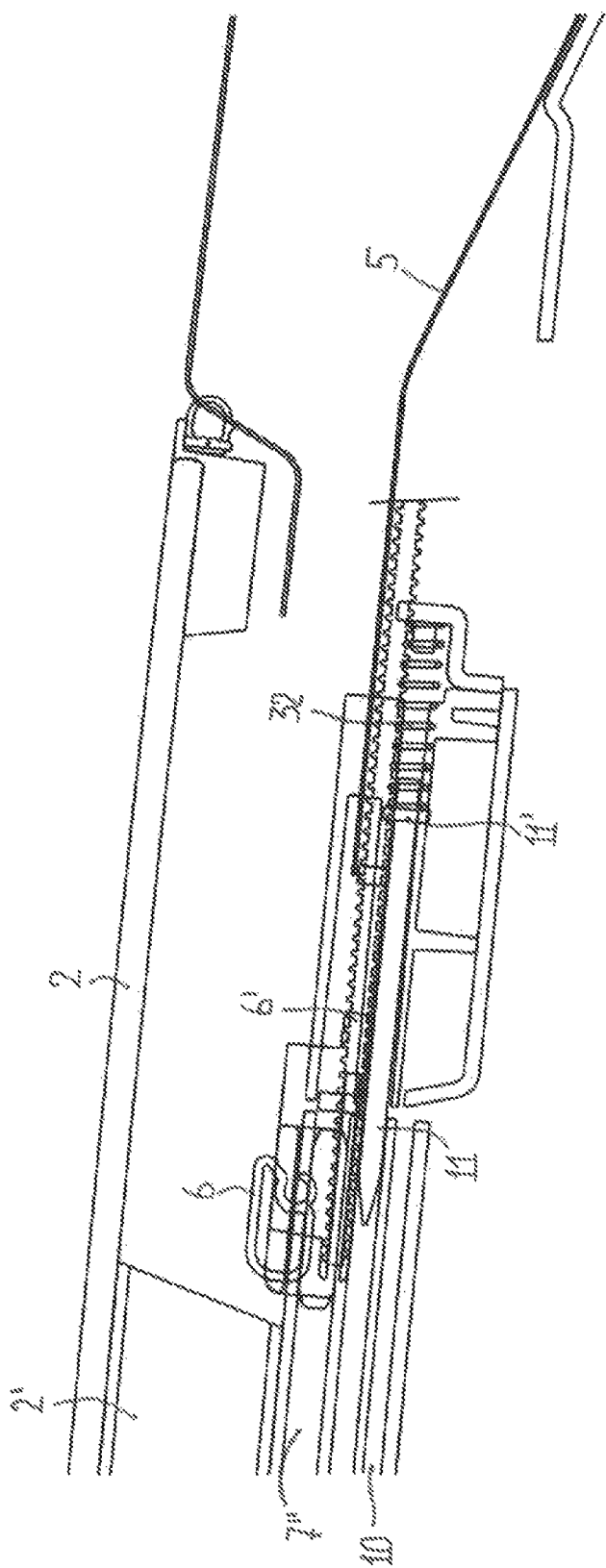

ROLLO ASSEMBLY

BACKGROUND

The discussion below is merely provided for general background information and is not intended to be used as an aid in determining the scope of the claimed subject matter.

Aspects of the invention relate to a rollo assembly intended for use in an open roof construction for a vehicle, comprising a rotatable winding shaft, a rollo screen of which a rear end can be wound on or off said winding shaft and of which an opposite forward end is provided with an operating beam, and opposite guide channels for in a longitudinal direction guiding opposite side edges of the rollo screen and opposite ends of the operating beam.

Nowadays there is an increasing demand for open roof constructions which provide roof openings with increased daylight performance.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Background.

In accordance with an aspect of the present invention the rollo assembly is characterized in that each of the guide channels is divided into a removable first guide channel part closest to the winding shaft and a second guide channel part further away from the winding shaft, wherein aligning members are provided for, in an assembled position of the rollo assembly, aligning respective ones of the first and second guide channel parts.

The division of the guide channels into a removable first guide channel part and a second guide channel part allows to divide the rollo assembly in (at least) two parts. The second guide channel parts may be combined with the open roof construction and be mounted therewith in a standard manner (for example top-loaded, that means from above the vehicle vertically downward towards and into/around the roof opening). The removable first guide channel parts may be mounted in any convenient manner (for example vertically upward from below the roof opening) into substantially the correct position with respect to the second guide channel parts, where after the aligning members provide the required final alignment between the first and second guide channel parts, such that a smooth guiding of the rollo screen side edges and operating beam ends is assured. Because the open roof construction now can be mounted in a top-loaded manner without the first guide channel parts and the first guide channel parts may be mounted from below, the rollo assembly can be located behind a roof opening and thus the effective roof opening (or daylight performance) of the open roof construction will be maximised.

In one embodiment the aligning members comprise first and second aligning channels having a fixed position relative to the first and second, respectively, guide channel parts and aligning pins which can translate therein between a release position in which they each do not engage at least one of said first and second aligning channels and an aligning position in which they engage corresponding first and second aligning channels. In such a release position generally the operating beam and rollo screen also will be positioned in only one of said first and second guide channel parts.

In the aligning position the aligning pins assure that not only the corresponding first and second aligning channels are properly aligned, but also the corresponding first and second guide channel parts for safeguarding that the rollo screen side edges and operating beam ends are guided in an appropriate manner without being hindered at the transition between said first and second guide channel parts when moving from one of the guide channel parts to the other.

Of course the fixed position of the respective aligning channels with respect to the corresponding guide channel parts has to be designed in such a manner that corresponding first and second guide channel parts are correctly aligned when corresponding first and second aligning channels are aligned (as a result of the operation of the aligning pins). During the aligning procedure one of the guide channel parts may align itself entirely with the other guide channel part. However, it is noted that it also is possible to provide facing frontal ends of the guide channel parts and of the aligning channels with some flexibility to compensate for slight misalignments between corresponding ones thereof when the rollo assembly has already be fixed completely.

It is noted that aspects of the invention encompass embodiments in which the rollo screen edges and the operating beam ends are guided in the same, or in different guide channels.

In one embodiment of the rollo assembly the winding shaft, operating beam, rollo screen, first guide channel parts and first aligning channels are combined into a detachable unit (which is detachable, for example, from the open roof construction or vehicle body) which, when the rollo screen is maximally wound onto the winding shaft, in a direction substantially perpendicularly to said longitudinal direction can be assembled with and disassembled from the second guide channel parts which are attached to the vehicle (e.g. to the open roof construction or vehicle body).

Such a unit in a very convenient manner may be mounted in a vertical direction upward from below the roof opening after the open roof construction (with the second guide channel parts) has been mounted (for example in a top-loaded manner as described before). The use of such a unit which combines a number of parts of the rollo assembly offers a distinct advantage in view of the fact that the detachable unit may be mounted from below after the open roof construction has been top-loaded, as a result of which the detachable unit may be located outside (behind or before) the roof opening, thus maximizing the daylight performance.

Therefore the use of such a unit which in a direction substantially perpendicularly to said longitudinal direction (in a normal position of use of the rollo assembly this will mean vertically) can be assembled with and disassembled from the second guide channel parts which are attacked to the vehicle, results in a completed structure of open roof construction with rollo assembly in which the main parts of the rollo assembly (as defined by said unit) are positioned below the open roof construction and thus do not decrease the effective roof opening, resulting in a maximised daylight performance.

Of course, the use of such a unit (but also the provision of guide channels which are divided into first and second guide channel parts) also allows an easy disassembly, for example for maintenance or repairs.

A holding assembly may be provided for temporarily keeping the unit in a provisional position during assembly before the aligning pins are used to achieve the final aligned situation. Such holding assembly, for example, may comprise positioning pins and/or holes, clamps and screws.

In one embodiment the aligning pins are manually translatable between the release and aligning positions. This means that during assembling or disassembling operations the aligning pins are moved from the release position towards the aligning position and vice versa, respectively, by hand.

For assuring that the aligning pins, once situated in the aligning position, remain in the desired position, locking members may be provided for locking the aligning pins in at least the aligning position. As an example fixation screws may be used. Additionally, detachable locking members may be provided for keeping the aligning pins in the release position (for example during an initial stage of assembly).

In an alternative embodiment the translation of the aligning pins from the release position to the aligning position is caused by a movement of the operating beam.

In such an embodiment an initial activation of the rollo assembly (which results in a movement of the operating beam of which the ends will slide in the respective guide channels) after assembling or mounting the detachable unit automatically will lead to a translation of the aligning pins toward the aligning position.

Then, in one preferred embodiment, each aligning pin in its release position is received within the respective first aligning channel while not engaging the respective second aligning channel and wherein on the detachable unit connecting members are provided for, when the operating beam moves in said longitudinal direction for unwinding the rollo screen from the winding shaft, transforming said movement of the operating beam into a translation of the aligning pins only until the aligning pins have reached their aligning positions.

Basically the aligning pins in such an embodiment are part of the detachable unit, as are the connecting members. The connecting members are designed in such a manner that the aligning pins as a result of a movement of the operating beam are translated only until reaching the aligning position. Thereafter a further movement of the operating beam (in the same direction) has no further influence on the position of the aligning pins. This means that the rollo assembly now can be used in a standard manner for moving the rollo screen between its desired positions.

It is possible that, once the aligning pins are in the aligning position, again moving the operating beam in a direction for winding the rollo screen onto the winding shaft will have no influence on the position of the aligning pins (which thus remain in the aligning position in all possible operational positions of the rollo assembly). In such a case only the first movement of the operating beam (after assembling the detachable unit) will cause a movement of the aligning pin. Again moving the aligning pins to the release position (for instance when the detachable unit should be disassembled for maintenance or repairs) then should occur through other means, for example manually.

In one embodiment each connecting member has a first end hingedly connected to the respective aligning pin and wherein the connecting member cooperates with the operating beam through a combination of first guide curve and first guide pin and cooperates with a stationary part of the detachable unit through a combination of second guide curve and second guide pin for, when the connecting member moves for translating the aligning pin, defining a movement of the connecting member between a connecting position in which the first guide pin and first guide curve cannot move relative to each other and a disconnecting position in which the first guide pin and first guide curve can move relative to each other such that the first guide pin can be disengaged from the first guide curve.

In such an embodiment the movement of the operating beam in a first situation (in the connecting position of the connecting members) is used for moving the connecting members in a manner causing a translation of the aligning pins, but also in a manner (when the aligning pins are approaching the aligning position) for causing the connecting members to move to their disconnecting position, and in a second situation (in the disconnecting position of the connecting members) no longer causes the connecting members and aligning pins to move and translate, respectively, and thus the operating beam (and therefore the rollo screen) may continue its movement.

Specifically, the first guide pin may be part of the operating beam, the first guide curve and second guide pin may be part of the connecting member and the second guide curve may be a part of the detachable unit having a stationary position relative to the first guide channel part.

In one embodiment, then the first guide curve (of the connecting member) has an inclined first guide curve part including an angle with the direction of translation of the aligning pin and receiving the first guide pin (of the operating beam) when the connecting member is in its connecting position and a straight first guide curve part extending in the direction of translation of the aligning pin through which the first guide pin can move when the connecting member is in its disconnecting position, wherein the second guide curve (stationary on the detachable unit) has a straight second guide curve part extending in the direction of translation of the aligning pin through which the second guide pin (on the connecting member) can move for defining the connecting position of the connecting member and an inclined second guide curve part including an angle with the direction of translation of the aligning pin receiving the second guide pin (of the connecting member) for defining the disconnecting position of the connecting member.

In a starting position (just after moving the detachable unit into its desired position, but before the aligning pins are moved towards the aligning position) a movement of the operating beam in a direction for unwinding the rollo screen causes the first guide pin to enter the corresponding inclined first guide curve part of the connecting member. Because this inclined first guide curve part (in the connecting position of the operating member at that moment) includes an angle with the direction of translation of the corresponding aligning pin (and thus also with the direction of movement of the first guide pin/operating beam), the movement of the first guide pin during a first stage causes a corresponding movement of the connecting member and thus (through the hinged connection thereof with the aligning pin) a translation of the aligning pin. During this first stage the second guide pin of the connecting member can travel along the stationary straight second guide curve part.

When the aligning pin approaches its aligning position, the second guide pin reaches the (stationary) inclined second guide curve part and as a result of the cooperation between said second guide pin and the inclined second guide curve part, the connecting member will move (through a rotation around its connection with the aligning pin) to its disconnecting position in which the straight first guide curve part that extends in the direction of translation of the aligning pin has received the first guide pin which then can move in (and finally out of) said straight first guide curve part without further moving the connecting member and aligning pin (while the aligning pin has reached its final aligning position).

In an alternative embodiment each aligning pin is preloaded by a spring member towards its aligning position and wherein a releasable locking member is provided for temporarily locking the aligning pin in its release position.

The locking member maintains the aligning pin in its release position, enabling the assembling operation of the detachable unit. Once the detachable unit has reached its required position, the locking member is released (for example manually or by other means) and the spring load causes the translation of the aligning pin towards its aligning position.

It is conceivable that the aligning pin can be translated back to its release position against the spring load, for example manually or by other means, when the detachable unit has to be disassembled (such as for maintenance or repairs). The locking member then again may engage the aligning pin for locking it in the release position.

In such an embodiment it is possible that the releasable locking member is defined on a locking lever which is provided on the detachable unit and which is rotatable between a locking position in which the locking member engages and locks the aligning pin and a release position in which said locking member disengages the aligning pin and wherein the locking lever further comprises an abutment part positioned for abutting a part of the vehicle during assembly of the detachable unit for causing the locking lever to rotate to its release position.

In such an embodiment the locking lever will automatically free the aligning pin when the detachable unit is mounted.

To increase the safety of the assembly (specifically for preventing that the locking lever frees the aligning pin prematurely) the locking lever may be preloaded towards its locking position by a spring member, which may be the same spring member as used for preloading the aligning pin.

In one embodiment each aligning pin is preloaded by a spring member towards its aligning position and wherein the aligning pin and operating beam have cooperating engagement members for keeping the aligning pin in its release position against the preload of the spring member as long as the operating beam has not been moved in said longitudinal direction for unwinding the rollo screen from the winding shaft.

In such an embodiment the translation of the aligning pin occurs automatically (as caused by the spring member) when the operating beam starts to move in said longitudinal direction for unwinding the rollo screen from the winding shaft.

In embodiments in which the operating beam is responsible for the translation of the aligning pins, it also is conceivable that the operating beam indirectly causes the movement of the aligning pins. For example a glide shoe (or other part) connected to the operating beam may engage an aligning pin or any part driving latter (such as a connecting member as discussed before). Or in other words: where in the description of embodiments the operating member is mentioned, any other part moving along with the operating beam may take the place of the operating beam without leaving the scope of the present invention.

Finally, in one embodiment of the rollo assembly the second guide channel parts are attached to a movable part of the open roof construction, such as a movable panel for opening and closing a roof opening. The design may be such that, before said movable part is moved (for example to an open position), the rollo assembly moves to a position in which the rollo screen is wound onto the winding shaft sufficiently to ensure that nor the operating beam nor the rollo screen is in the second guide channel parts. Further it will be ensured that the aligning pins are translated to the release position before the movable part will start to move. Any appropriate of the embodiments described before, alone or in combination, may be used to achieve such operation of the rollo assembly, preferably in combination with an appropriate control system.

For moving the operating beam (and rollo screen) between different positions, a drive system may be provided, for example comprising push/pull cables driven by an electric motor. Such push/pull cables may comprise drive tabs which can come into engagement with counter parts of the rollo assembly when latter is mounted, for example recesses at opposite ends of the operating beam. This results in a construction in which a driving connection with the rollo assembly is achieved automatically when the rollo assembly is mounted in the vehicle.

BRIEF DESCRIPTION OF THE DRAWINGS

Hereinafter aspects of the invention will be elucidated while referring to the drawing, in which:

FIGS. 13 and 14 show, in a side elevational view, a fourth embodiment in two different positions.

DETAILED DESCRIPTION OF THE ILLUSTRATIVE EMBODIMENTS

Figure 1:
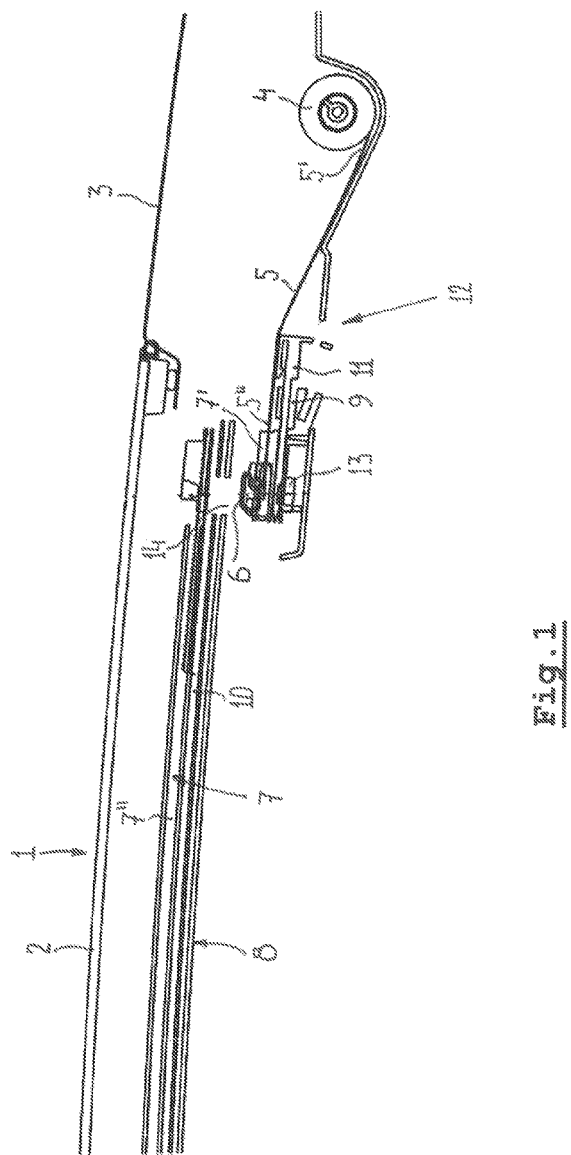
FIGS. 1-4 show schematic side elevational views of a first embodiment in four different positions.

FIG. 1 in a schematic side elevational view illustrates part of a rollo assembly which is intended for use in an open roof construction (generally indicated by reference number 1 and for example comprising a movable panel 2 for opening and closing a roof opening) for a vehicle (of which a stationary part 3, for example a stationary roof part, has been shown). As its main components the rollo assembly comprises a rotatable winding shaft 4, a rollo screen 5 of which a rear end 5' can be wound on or off said winding shaft 4 and of which an opposite forward end 5" is provided with (or attached to) an operating beam 6.

The manner in which the winding shaft 4 is driven may vary and is not important for the present invention. One option is that the winding shaft 4 is spring loaded for winding the rollo screen 5.

The rollo assembly further comprises opposite guide channels 7 for in a longitudinal direction guiding opposite side edges of the rollo screen 5 and opposite ends of the operating beam 6. These guide channels 7 (of which only one is shown) generally will be positioned near to opposite edges of a roof opening. The guide channels 7 may be part of a guide assembly 8 which comprises one or more of such guide channels 7 (for example separate guide channels for the rollo screen 5 and for the operating beam 6 or just a single guide channel for both the rollo screen 5 and operating beam 6).

Each of the guide channels 7 is divided into a removable first guide channel part 7' closest to the winding shaft 4 and a second guide channel part 7" further away from the winding shaft.

FIG. 1 further shows a first aligning channel 9 and a second aligning channel 10 having a fixed position relative to the first and second guide channel parts 7' and 7", respectively. In the situation illustrated in FIG. 1 an aligning pin 11 is received within the first aligning channel 9. As will appear below the aligning pin 11 can translate between a release position (in accordance with FIG. 1) in which it engages only the first aligning channel 9 and an aligning position (illustrated in FIG. 4) in which it engages corresponding first and second aligning channels 9 and 10.

The winding shaft 4, operating beam 6, rollo screen 5, first guide channel parts 7' and first aligning channels 9 are combined into a detachable unit 12 which, starting in a position as illustrated in FIG. 1 when the rollo screen 5 is maximally wound onto the winding shaft 4, in an upward direction substantially perpendicularly to said longitudinal direction in which the guide channels 7 extend can be assembled with and disassembled from (in a downward direction) the second guide channel parts 7" which are attacked to (a stationary part of) the vehicle. In a manner to be described below the aligning channels 9,10 and aligning pins 11 define aligning means for, in an assembled position of the rollo assembly (that is a position in which the detachable unit 12 has assumed its required position, see FIGS. 3 and 4), aligning respective ones of the first and second guide channel parts 7' and 7".

For helping in initially positioning the detachable unit 12, it may be provided with positioning tabs 13 (only one of which has been represented) cooperating with positioning recesses 14, for example in the guide assembly 8.

Figure 2:
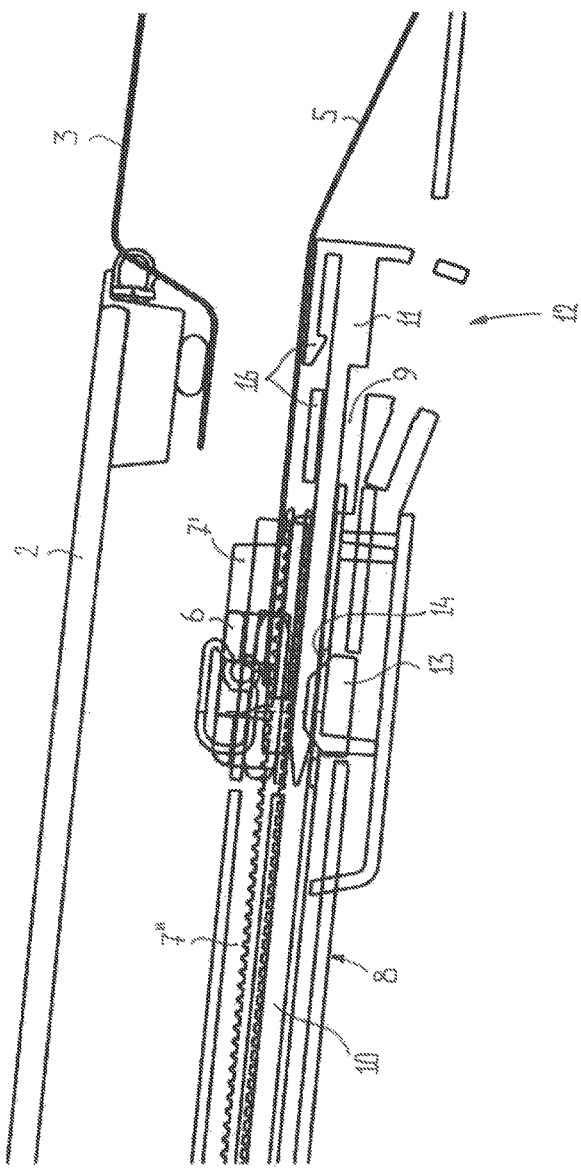

FIG. 2, on a larger scale, shows a position in which the detachable unit 12, after being lifted, by means of the positioning tab 13 and positioning recess 14 has assumed an initial position which generally corresponds with its required final position. The aligning pin 11 does not yet engage the second aligning channel 10. The operating beam 6 still is positioned in the first guide channel part 7'. This position of the detachable unit 12 may be provided by temporary attachment means (not shown).

Figure 3:
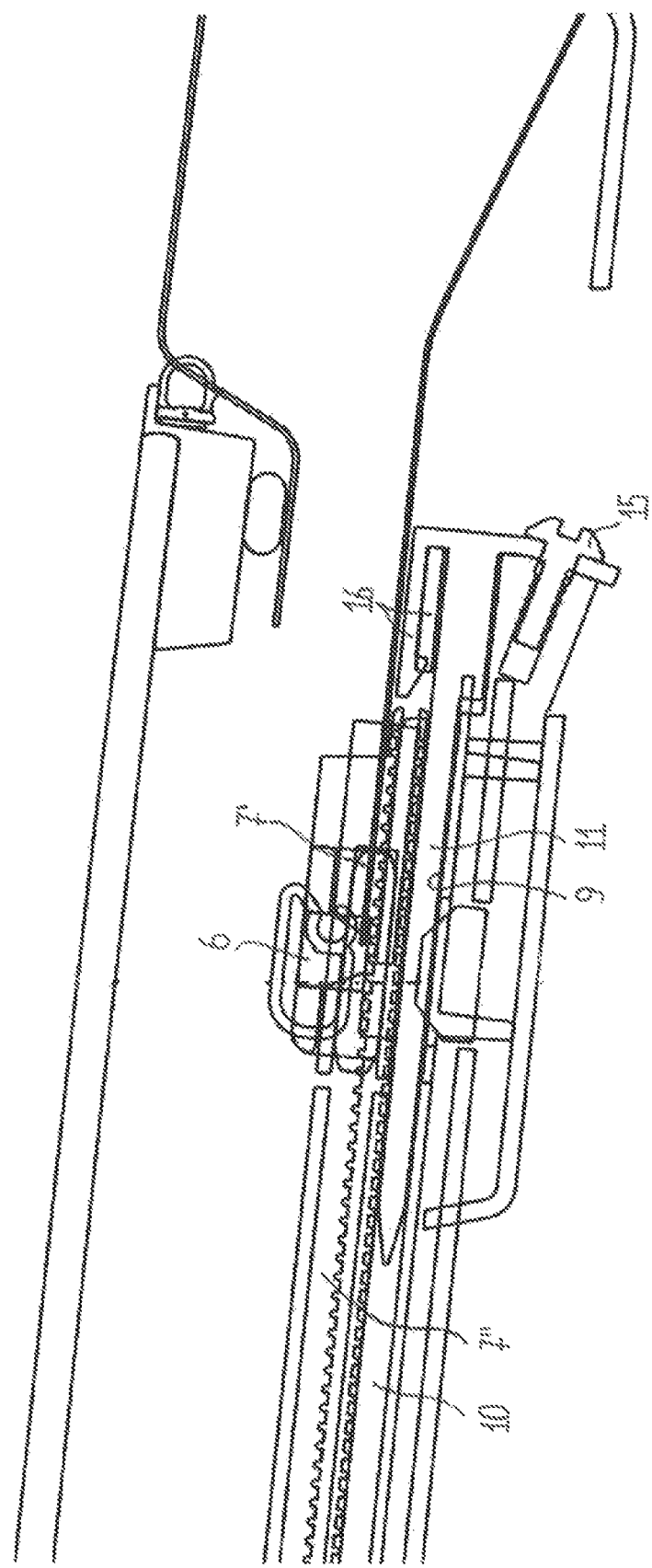

In FIG. 3 the aligning pin 11 has been translated (for example manually) to a position in which it engages both the first aligning channel 9 and second aligning channel 10 for aligning these, thus also aligning the first and second guide channel parts 7' and 7".

A locking member 15 (for example a screw) is provided for locking the aligning pin 11 in at least the aligning position. A snap assembly 16 (see FIG. 2) may be provided too (snapped into engagement in FIG. 3).

Figure 4:
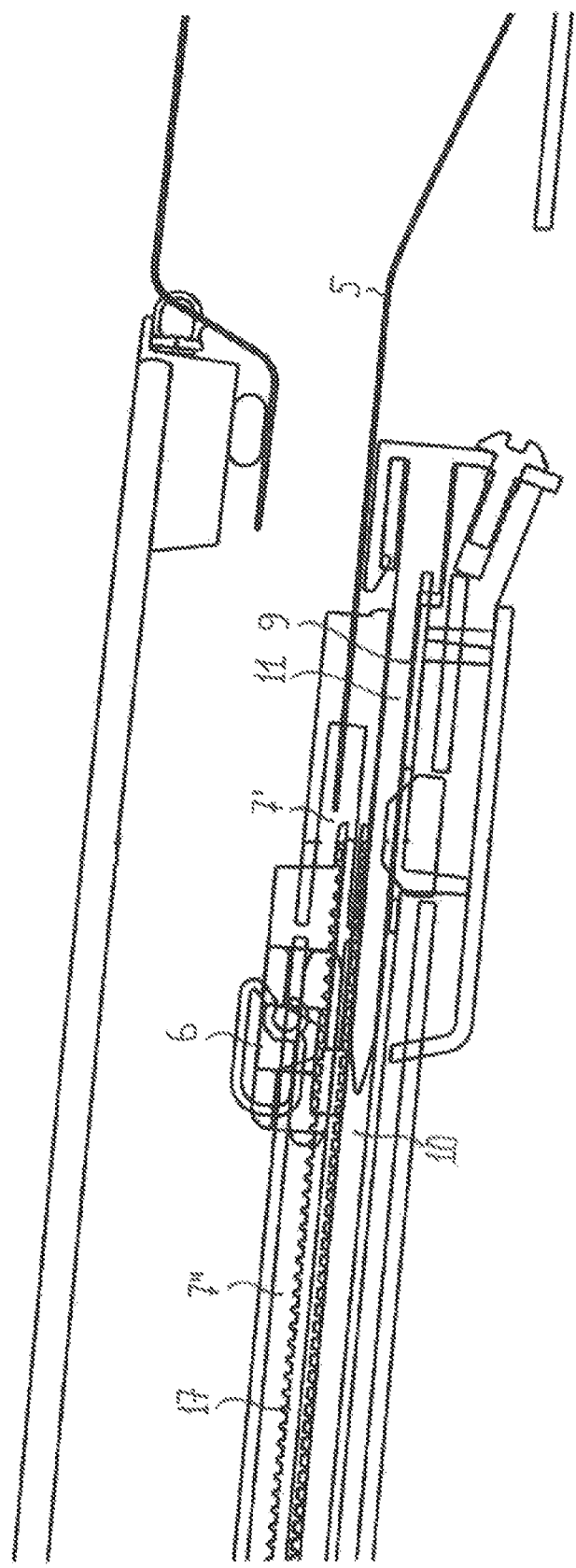

FIG. 4 shows that the operating beam 6 (with rollo screen 5) has been moved for at least partially unwinding the rollo screen 5. In FIG. 4 the operating beam already has entered the second guide channel part 7". The movement of the operating beam 6 may be caused by a push/pull cable 17 with which the operating beam 6 (or another part attached to the operating beam) automatically is brought into engagement when the detachable unit 12 is mounted (moved upwards).

For disassembling the detachable unit 12 (e.g. for repairs or maintenance) the aligning pin 11 again may be translated to a position in which it has disengaged the second aligning channel 10 (it also is conceivable that the aligning pin is removed entirely from the first aligning channel 9 too, or that the aligning pin is disengaged from the first aligning channel 9 by sliding it into the second aligning channel 10).

Next, FIGS. 5-8 will be used for describing an embodiment of the rollo assembly in which the translation of the aligning pins 11 from the release position to the aligning position is caused by a movement of the operating beam 6.

Figure 5:
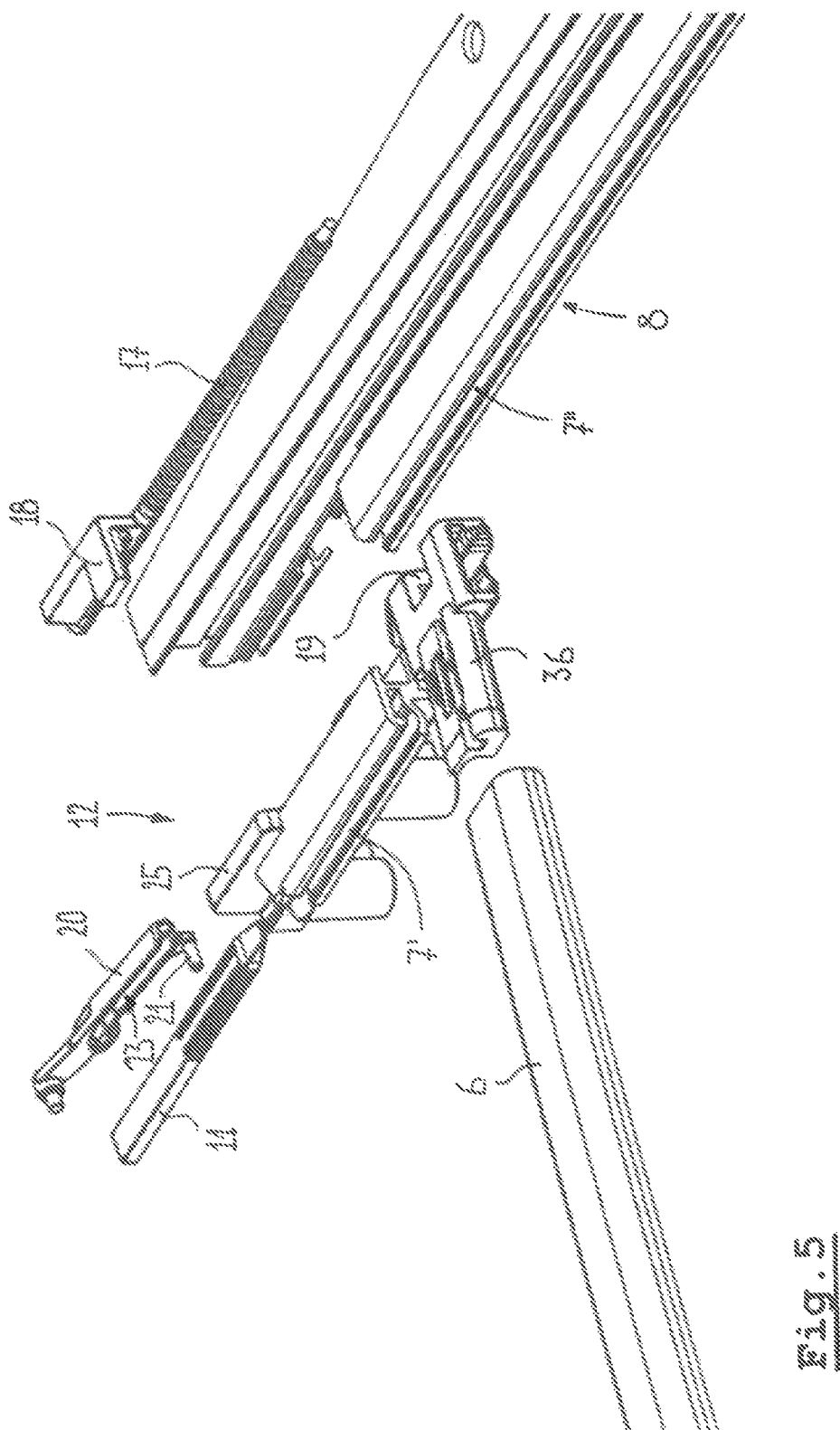
FIG. 5 schematically illustrates a perspective, partly taken apart second embodiment.

FIG. 5 shows the main components of such a rollo assembly in a perspective view and taken apart. The guide assembly 8 comprises the second guide channel part 7", whereas the detachable unit 12 comprises the first guide channel part 7'. The operating beam 6 has outer ends 36 (only one of which is shown) for cooperation with the guide channel parts 7' and 7". FIG. 5 also shows the aligning pin 11 and a connecting member 20 which, in a manner to be described below, is provided for, when the operating beam 6 moves in said longitudinal direction for unwinding the rollo screen 5 from the winding shaft 4, transforming said movement of the operating beam 6 into a translation of the aligning pin 11. Specifically this transformation will occur only until the aligning pin 11 has reached its aligning position.

FIG. 5 also shows the push/pull cable 17 (for example driven by an electric motor not illustrated) having attached thereto a drive tab 18 which will engage a corresponding drive recess 19 of the operating beam 6 when the detachable unit 12 is assembled or mounted.

Figure 6:
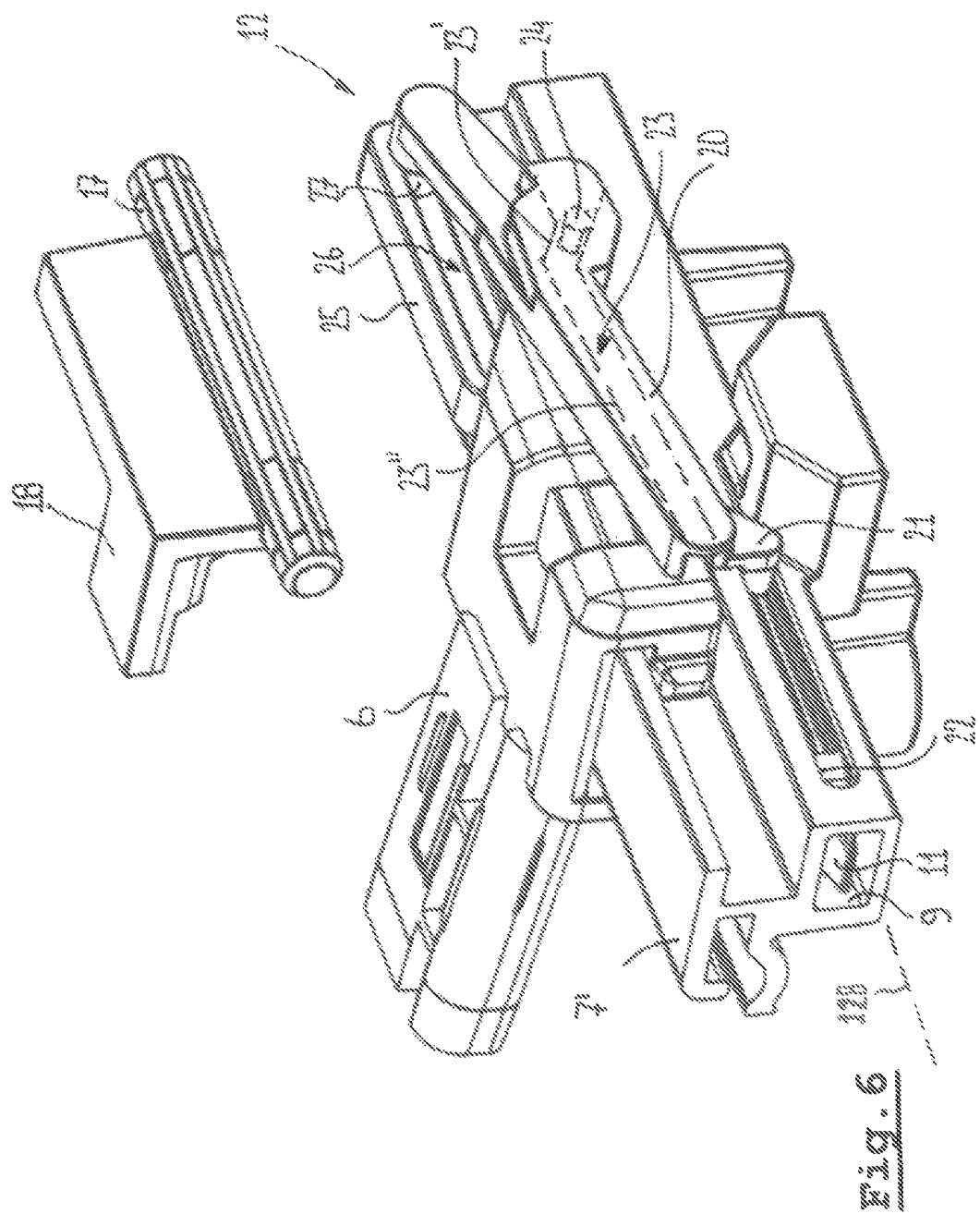
FIGS. 6-8 show perspective views of the second embodiment in three different positions.

Referring to FIG. 6 the operating beam 6 is illustrated in a position cooperating with the first guide channel part 7' but with the detachable unit 12 not yet assembled or mounted (basically in correspondence with FIG. 1 for the first embodiment). The aligning pin 11 is in its release position received within the respective first aligning channel 9 while not engaging the respective second aligning channel 10 (which has not been illustrated here).

The connecting member 20 has a first end 21 hingedly connected to the respective aligning pin 11 (through a slot 22 in a wall of the first aligning channel 9). The connecting member 20 further cooperates with the operating beam 6 through a combination of first guide curve 23 formed in the connecting member and first guide pin 24 provided on the operating beam 6. Moreover the connecting member 20 cooperates with a stationary part 25 of the detachable unit 12 through a combination of second guide curve 26 formed in said stationary part 25 and second guide pin 27 provided on the connecting member 20.

The first guide curve 23 has an inclined first guide curve part 23' including an angle with the direction of translation 128 of the aligning pin 11 and receiving the first guide pin 24 when the connecting member 20 is in a connecting position (shown in FIGS. 6 and 7), and a straight first guide curve part 23" which, when the connecting member 20 is in a disconnecting position (shown in FIG. 8) extends in the direction of translation 128 of the aligning pin 11, such that first guide pin 24 can move therein and there along.

The second guide curve 26 has a straight second guide curve part 26' extending substantially in the direction of translation 128 of the aligning pin 11 through which the second guide pin 27 can move for defining the connecting position of the connecting member 20 and an inclined second guide curve part 26" including an angle with the direction of translation 128 of the aligning pin 11 in which the second guide pin 27 is received for defining the disconnecting position of the connecting member 20.

Although in this embodiment the first guide pin 24 is part of the operating beam 6, the first guide curve 23 and second guide pin 27 are part of the connecting member 20 and the second guide curve 26 is a part of the stationary part 25 of the detachable unit 12 having a stationary position relative to the first guide channel part 7', also other dispositions are possible which are mechanically equivalent.

Figure 7:
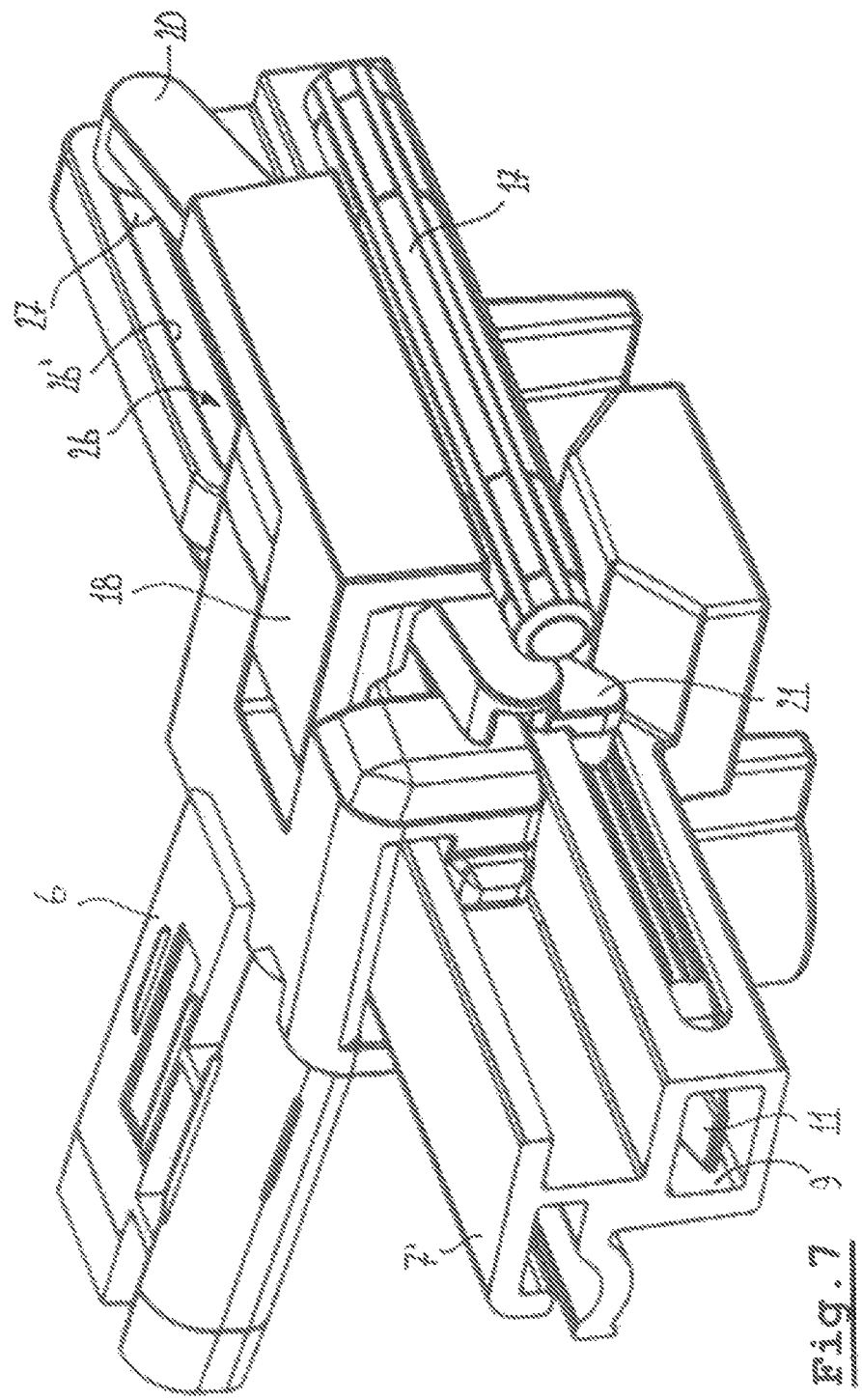
Figure 8:
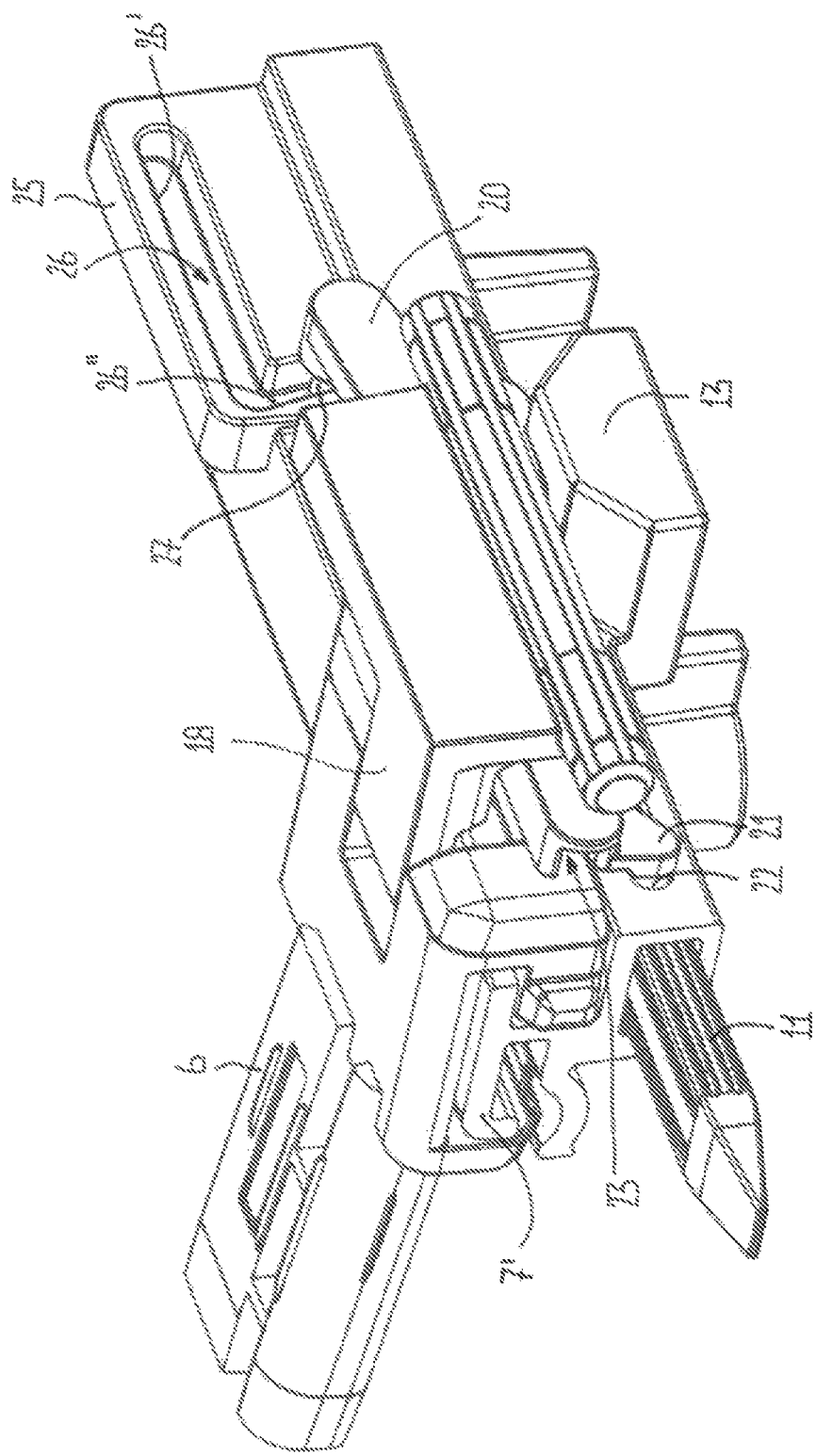

In a starting position as illustrated in FIG. 7 (just after moving the detachable unit 12 into its desired position, but before the aligning pins 11 are moved towards the aligning position, thus a position corresponding with FIG. 2 for the first embodiment) a movement of the operating beam 6 in a direction for unwinding the rollo screen 5 causes the first guide pin 24 to enter the corresponding inclined first guide curve part 23' of the connecting member 20 (best visible in FIG. 6). Because this inclined first guide curve part 23' (in the connecting position of the operating member 20 at that moment) includes an angle with the direction of translation 128 of the corresponding aligning pin 11 (and thus also with the direction of movement of the first guide pin 24/operating beam 6), the movement of the first guide pin 24 during a first stage causes a corresponding movement of the connecting member 20 and thus (through the hinged connection at the first end 21 thereof with the aligning pin 11) a translation of the aligning pin 11. During this first stage the second guide pin 27 of the connecting member 20 can travel along the stationary straight second guide curve part 26'.

When the aligning pin 11 approaches its aligning position, the second guide pin 27 reaches and enters the (stationary) inclined second guide curve part 26" and as a result of the cooperation between said second guide pin 27 and the inclined second guide curve part 26", the connecting member 20 will move (through a rotation around its connection with the aligning pin 11) to its disconnecting position (illustrated in FIG. 8) in which the straight first guide curve part 23" (that now extends in the direction of translation 128 of the aligning pin 11) has received the first guide pin 24 which then can move in and along (and finally out of) said straight first guide curve part 23" without further taking along the connecting member 20 and aligning pin 11 (while the aligning pin 11 has reached its final aligning position).

The end position of the connecting member 20 (and thus of the aligning pin 11) also will be defined by the end of the slot 22 engaging the first end 21 of the connecting member 20.

When the operating beam 6 again moves back for winding the rollo screen 5 onto the winding shaft 4, the first guide pin 24 on the operating beam again will enter the straight first guide curve part 23" and the reverse order of steps will occur.

Figure 9:
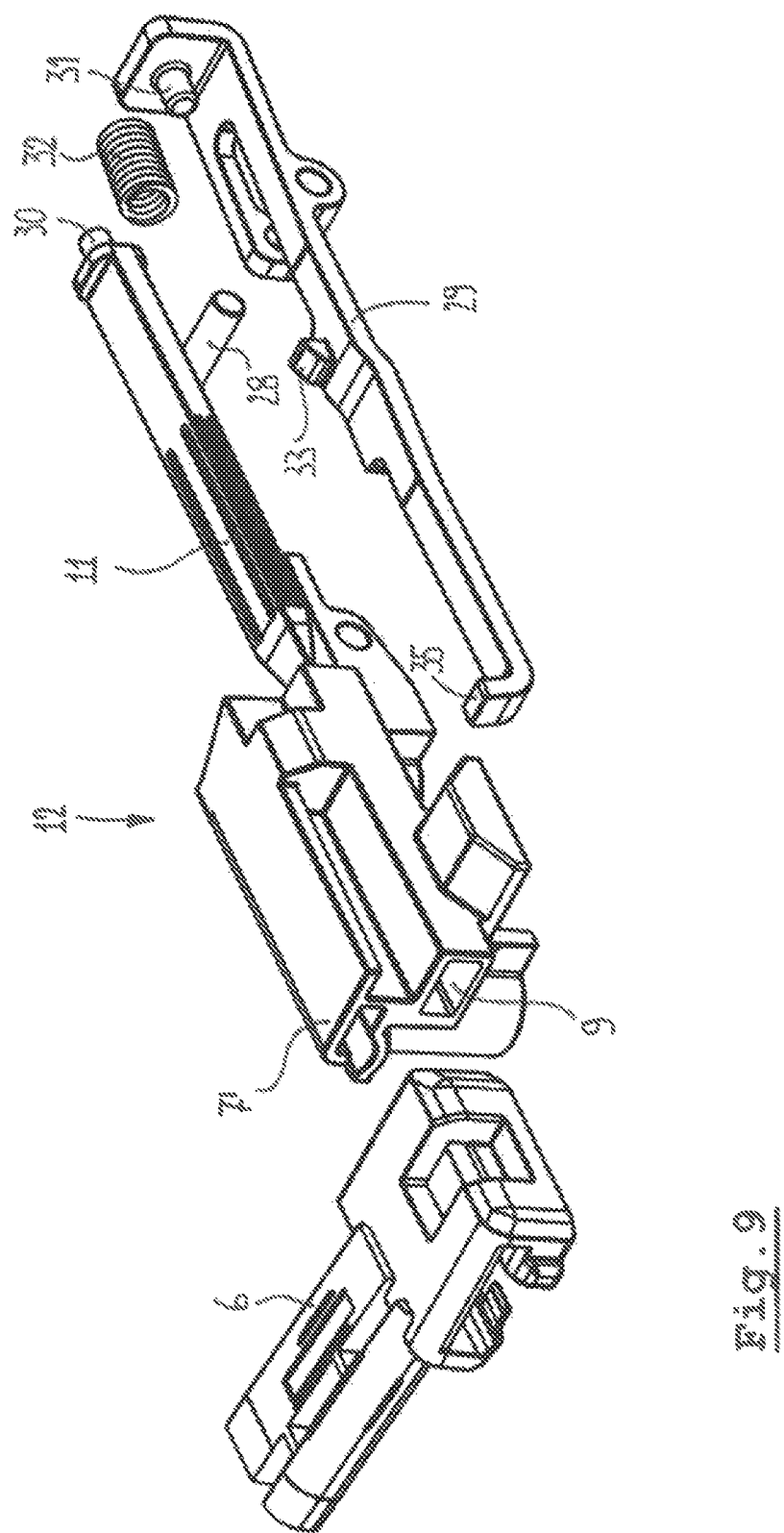
FIG. 9 schematically illustrates a perspective, partly taken apart third embodiment.

FIGS. 9-12 show a third embodiment. FIG. 9 shows some parts in a taken apart position. The detachable unit 12 (of which the first guide channel part 7' and the first aligning channel 9 are shown) is provided with a pivot 28 for pivotably receiving a locking lever 29. The aligning pin 11 comprises a projection 30 and the locking lever comprises a projection 31. Both projections 30 and 31 are meant for receiving a spring 32.

The locking lever 29 comprises a locking tab 33 for cooperation with a locking recess 34 of the aligning pin 11 (see FIG. 11) and an abutment part 35 positioned for abutting a part of the vehicle during assembly of the detachable unit for causing the locking lever 29 to rotate to a release position.

Figure 10:
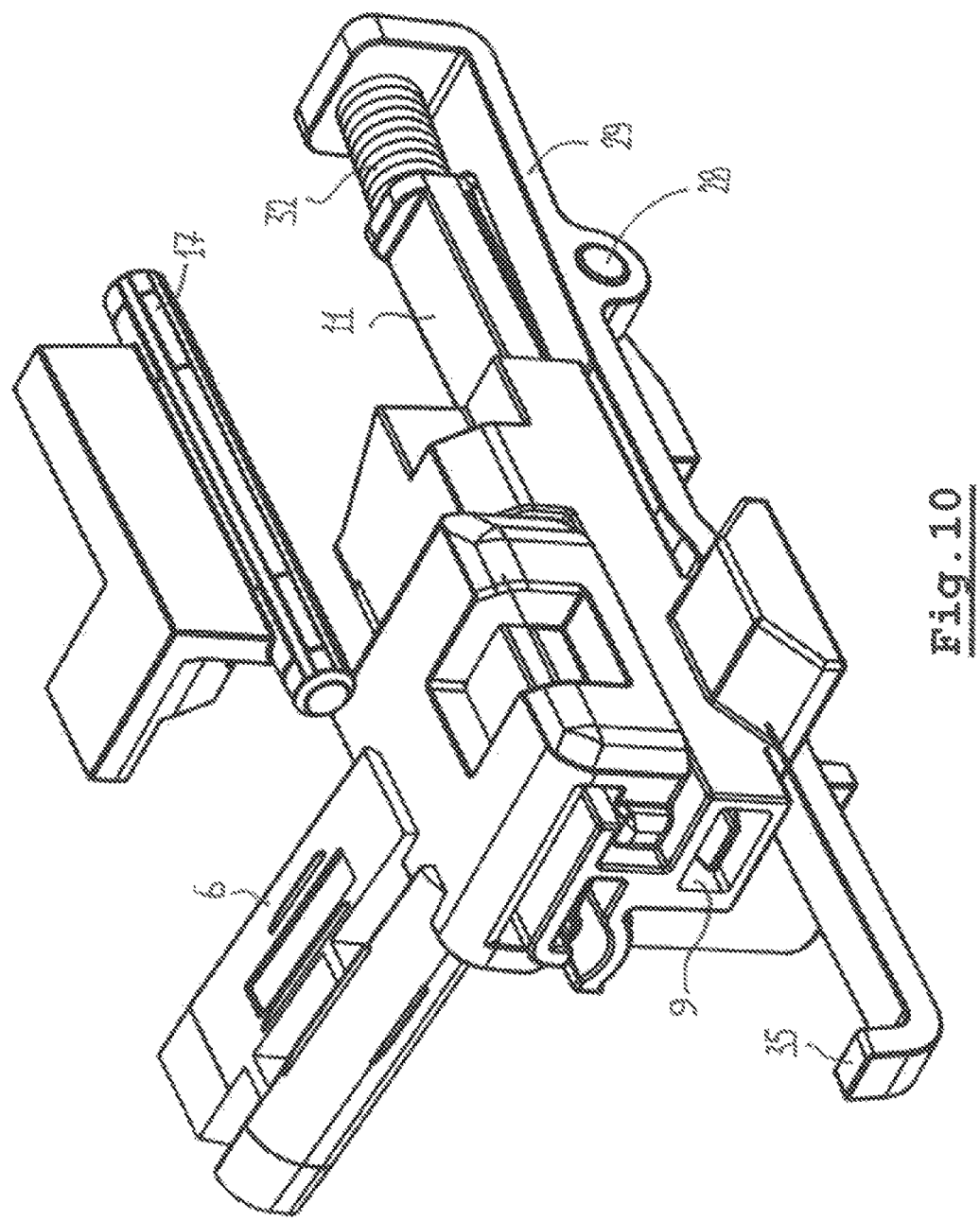
FIG. 10 shows a perspective view of the third embodiment in a first position.
Figure 11:
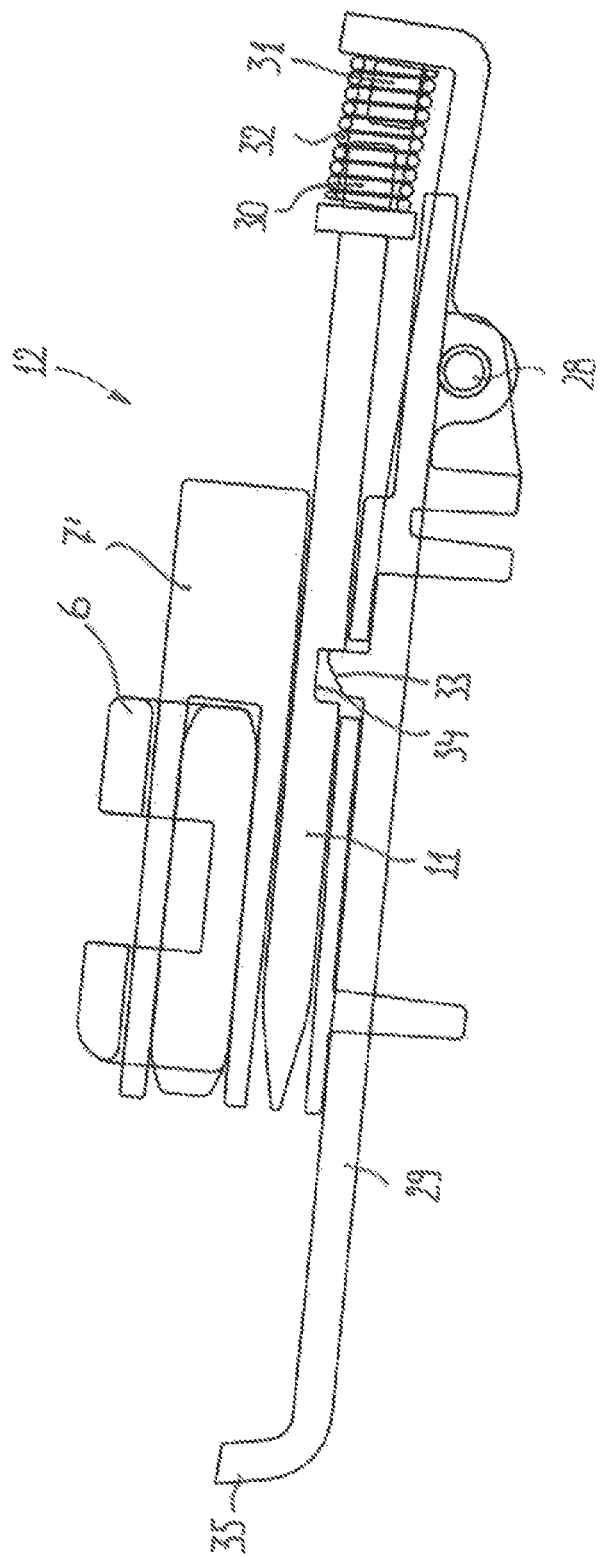
FIGS. 11 and 12 show the third embodiment in two positions in a side elevational view.
Figure 12:
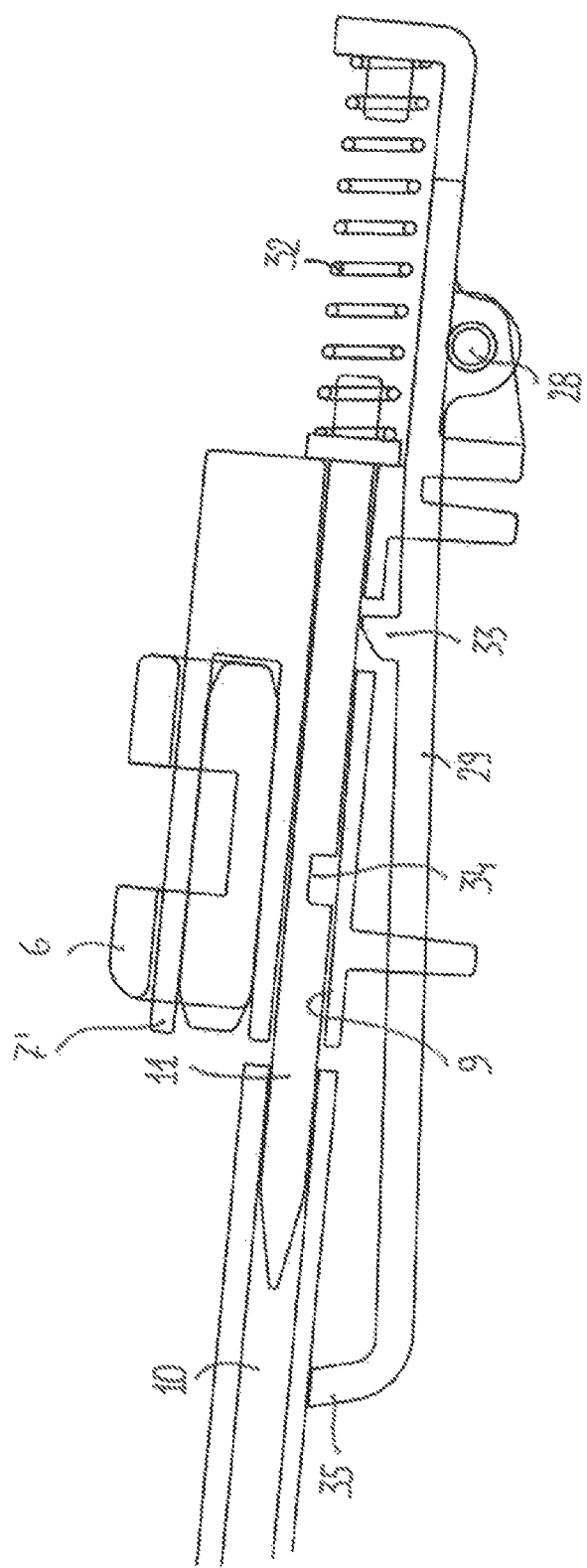

In FIGS. 10 and 11 a position is illustrated (before assembly or mounting of the detachable unit 12) in which the aligning pin 11 is preloaded by the spring 32 towards its aligning position but is locked by the engagement between the locking tab 33 and locking recess 34 (best shown in FIG. 11) in a locking position of the locking lever 29. Thus the aligning pin 11 is temporarily locked in its release position. When the detachable unit 12 is moved upward to its assembled (mounted) position the abutment part 35 will engage a part of the vehicle (in this embodiment the second aligning channel 10) such that the locking lever 29 will rotate around pivot 28 to a release position in which the locking tab 33 has released locking recess 34 on the aligning pin 11 which then, urged by the spring 32, will move to its aligning position in which it also engages the second aligning channel 10 (FIG. 12).

It is noted that in this embodiment the spring 32 not only loads the aligning pin 11 to its aligning position, but also loads the locking lever 29 to its locking position. It is conceivable, however, that separate spring members are used.

Figure 13:
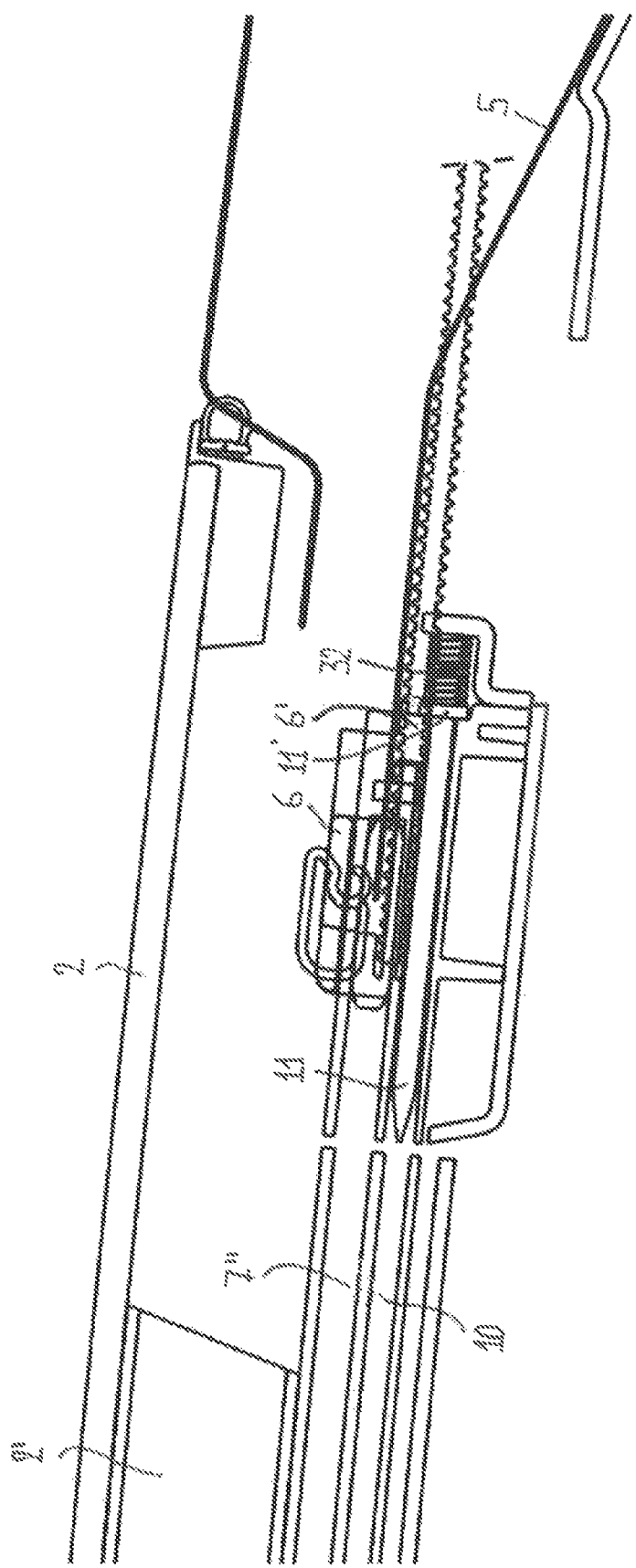

Finally, FIGS. 13 and 14 show a fourth embodiment in a side elevational view. In this embodiment of the rollo assembly the aligning pin 11 also is preloaded by a spring 32 towards its aligning position but NOW the aligning pin 11 and operating beam 6 have cooperating engagement members (or shoulders) 6' and 11' for keeping the aligning pin 11 in its release position against the preload of the spring 32 as long as the operating beam 6 has not been moved in said longitudinal direction for unwinding the rollo screen 5 from the winding shaft 4 (FIG. 13). Once the operating beam 6 moves (FIG. 14) the spring 32 urges the aligning pin 11 in its aligning position in which it also engages the second aligning channel 10.

This embodiment also shows the feature that the second guide channel part 7" (and corresponding other parts of the guide assembly 8) are attached to a movable part of the open roof construction, such as the movable panel 2 (through a brace 2').

The design may be such that, before said movable panel 2 is moved (for example to an open position), the rollo assembly moves to a position in which the rollo screen 5 is wound onto the winding shaft 4 sufficiently to ensure that nor the operating beam 6 nor the rollo screen 5 is in the second guide channel parts 7". Further it will be ensured that the aligning pins 11 are translated to the release position before the movable panel 2 will start to move.

The invention is not limited to the embodiments described before which may be varied widely within the scope of the invention as defined by the appending claims. For example, each aligning pin may be embodied as a fork-like element having multiple aligning teeth. Another option is that multiple aligning pins are used at each side of the rollo assembly.

What is claimed is:
1. A rollo assembly for use in an open roof construction for a vehicle, comprising:
   a rotatable winding shaft,
   a rollo screen which at a rear end is attached to and is configured to be wound on or off the winding shaft and of which an opposite forward end is provided with an operating beam,
   guide channels configured to guide in a longitudinal direction opposite side edges of the rollo screen and opposite ends of the operating beam, wherein each of the guide channels includes a removable first guide channel part closest to the winding shaft and a second guide channel part further away from the winding shaft, and
   aligning members configured to align, in an assembled position of the rollo assembly, each of the first and second guide channel parts, wherein the aligning members each comprise first and second aligning channels having a fixed position relative to the first and second, respectively, guide channel parts, and an aligning pin, each aligning pin configured to translate within the corresponding first and second aligning channels between a release position, in which the aligning pin does not engage at least one of corresponding first and second aligning channels, and an aligning position, in which the aligning pin engages corresponding first and second aligning channels.

2. The rollo assembly according to claim 1, wherein the winding shaft, operating beam, rollo screen, first guide channel parts and first aligning channels comprise a detachable unit, and, when the rollo screen is maximally wound onto the winding shaft in a direction substantially perpendicularly to said longitudinal direction, the detachable unit is assembled with and disassembled from the second guide channel parts which are configured to be attached to the vehicle.

3. The rollo assembly according to claim 1, wherein the aligning pins are manually translatable between the release and aligning positions.

4. The rollo assembly according to claim 1, and further comprising locking members configured to lock the aligning pins in at least the aligning position.

5. The rollo assembly according to claim 2, wherein the aligning pins are each configured to be translated from the release position to the aligning position by a movement of the operating beam.

6. The rollo assembly according to claim 5, wherein each aligning pin in its release position is received within the respective first aligning channel while not engaging the respective second aligning channel and wherein the detachable unit includes connecting members, and when the operating beam moves in said longitudinal direction for unwinding the rollo screen from the winding shaft, the connecting members are configured to transform said movement of the operating beam into a translation of the aligning pins only until the aligning pins have reached their aligning positions.

7. The rollo assembly according to claim 6, wherein each connecting member has a first end hingedly connected to the respective aligning pin and wherein the connecting member cooperates with the operating beam through a combination of first guide curve and first guide pin and cooperates with a stationary part of the detachable unit through a combination of second guide curve and second guide pin that, when the connecting member moves for translating the aligning pin, define a movement of the connecting member between a connecting position and a disconnecting position, wherein relative positions of the first guide pin and the first guide curve are fixed when the connecting member is in the connecting position, and the first guide pin and first guide curve are configured to moves relative to each other and the first guide pin is disengaged from the first guide curve when the connecting member is in the disconnecting position.

8. The rollo assembly according to claim 7, wherein the first guide pin is part of the operating beam, the first guide curve and second guide pin are part of the connecting member and the second guide curve is a part of the detachable unit having a stationary position relative to the first guide channel part.

9. The rollo assembly according to claim 8, wherein the first guide curve has an inclined first guide curve part including an angle with a direction of translation of the aligning pin and receiving the first guide pin when the connecting member is in its connecting position and a straight first guide curve part extending in the direction of translation of the aligning pin through which the first guide pin moves when the connecting member is in its disconnecting position, wherein the second guide curve has a straight second guide curve part extending in the direction of translation of the aligning pin through which the second guide pin moves for defining the connecting position of the connecting member and an inclined second guide curve part including an angle with the direction of translation of the aligning pin, the second guide curve part receiving the second guide pin for defining the disconnecting position of the connecting member.

10. The rollo assembly according to claim 2, and further comprising:
at least one spring member configured to preload at least one of the aligning pins towards each associated aligning position, and
at least one releasable locking member configured to temporarily lock at least one of the aligning pins in its release position.

11. The rollo assembly according to claim 10, and further comprising:
a locking lever having the releasable locking member and provided on the detachable unit, the locking lever being rotatable between a locking position in which the locking member engages and locks at least one aligning pin and a release position in which said locking member disengages the at least one aligning pin and wherein the locking lever further comprises an abutment part configured to abut a part of the vehicle during assembly of the detachable unit so as to cause the locking lever to rotate to its release position.

12. The rollo assembly according to claim 11, and further comprising a spring member configured to preload the locking lever towards its locking position.

13. The rollo assembly according to claim 12, wherein said spring member is the same spring member as used for preloading the aligning pin.

14. The rollo assembly according to claim 5, wherein:
the rollo assembly comprises at least one spring member configured to preload at least one of the aligning pins towards each associated aligning position; and
at least one of the aligning pins and the operating beam have cooperating engagement members configured to keep the at least one of the aligning pins in its release position against the preload of the spring member as long as the operating beam has not been moved in said longitudinal direction for unwinding the rollo screen from the winding shaft.

15. The rollo assembly according to claim 5, wherein the operating beam indirectly causes the movement of the aligning pins.

16. The rollo assembly according to claim 1, wherein the second guide channel parts are attached to a movable part of the open roof construction.

17. The rollo assembly according to claim 1 and further comprising a movable panel configured to open and close an opening in the vehicle, wherein the second guide channel is connected to the movable panel.

* * * * *